United States Patent [19]

Yamamori et al.

[11] 4,015,272

[45] Mar. 29, 1977

[54] INK EJECTION TYPE WRITING UNIT

[75] Inventors: Kiyoshi Yamamori; Masayoshi Miura; Akira Mizoguchi, all of Kawasaki, Japan

[73] Assignee: Matsushita Electric Industrial Co., Ltd., Japan

[22] Filed: Aug. 7, 1975

[21] Appl. No.: 602,914

[30] Foreign Application Priority Data

Aug. 14, 1974 Japan .............................. 49-93711

[52] U.S. Cl. .............................. 346/140 R; 222/108

[51] Int. Cl.$^2$ .............................. G01D 15/18

[58] Field of Search ............. 346/140, 75; 239/102, 239/101, 124, 121; 222/108

[56] References Cited

UNITED STATES PATENTS

| | | | |
|---|---|---|---|
| 2,036,120 | 3/1936 | Cheetham et al. | 222/108 |
| 3,657,599 | 4/1972 | Kashio | 346/75 X |
| 3,708,798 | 1/1973 | Hildenbrand et al. | 346/140 |
| 3,747,120 | 7/1973 | Stemme | 346/140 X |
| 3,900,162 | 8/1975 | Titus et al. | 346/75 X |

*Primary Examiner*—Joseph W. Hartary
*Attorney, Agent, or Firm*—Robert E. Burns; Emmanuel J. Lobato; Bruce L. Adams

[57] ABSTRACT

A writing unit for applying fluid droplets to a surface includes a chamber which is divided into an outer chamber portion and an inner chamber portion which are connected by a connecting channel. A discharge channel is connected to the outer chamber portion in alignment with the connecting channel. A piezoelectrical transducer is provided adjacent the inner chamber portion opposite to the outer chamber portion to produce short duration pressure increases to eject the liquid in the chamber from the discharge channel in pulsed jets to the surface. The inner and outer chamber portions are communicated to the atmosphere by respective vent passageways to withdraw the air in the chamber when the writing unit is first loaded with liquid and the bubbles introduced into the liquid in the chamber during normal operation. The vent passageways are closed during ink ejection process.

2 Claims, 6 Drawing Figures

INK EJECTION TYPE WRITING UNIT

BACKGROUND OF THE INVENTION

The present invention relates to an arrangement for applying fluid droplets to a surface, and more particularly to improvement to a mechanism for writing on paper with an ejected ink The speed of recording data on paper in, for example, a data processing system is limited for one thing by the capability of the writing mechanism, which in many cases is substantially less than that of the data processing system.

Because of the high speed capability of the ink ejection type writing mechanism, many proposals have been made in which the liquid is discharged onto the paper by application of electrical pulses, the liquid being ejected in a series of pulsed jets. The speed of the writing mechanism is in turn largely determined by the capability of the liquid responding to the rapidly occurring electrical pulses.

U.S. Pat. No. 3,747,120 discloses an ink ejection type writing mechanism which utilizes a piezoelectrical crystal as a means for creating pressure variations in the liquid, and which comprises a chamber which is divided into an inner and outer chamber portions for accommodating the liquid, an intake channel communicating between a liquid supply container and the outer chamber portion and a discharge channel through which the fluid is ejected for deposition onto the surface. The outer and inner chamber portions are in communication through a connecting channel which is axially aligned with the discharge channel. The outer chamber portion has a narrow width to permit the liquid in the intake channel to admit thereinto by capillary action. The piezoelectrical crystal is positioned adjacent the inner chamber portion and adapted to apply the varying pressure to the liquid in the chamber by electrical pulses applied thereto.

In order to meet the speed requirements of the data processing system, the writing mechanism should be driven by pulses occurring at a rate higher than 5 kHz, preferably in the range of 10 to 30 kHz. Under these circumstances, it is experienced that the fluid droplets are not satisfactorily discharged because of the slow response characteristic of the prior art writing mechanism.

One of the limitations which have been imposed on the response characteristics of the writing mechanism is the creation of bubbles in the liquid in the chamber. Because of their compressibility, pressure variations produced by the electrical pulses are partly absorbed by the bubbles. Because the inner and outer chamber portions are closed by the piezoelectrical crystal and the surrounding wall, the chamber is conventionally evacuated before the unit is first filled with liquid and when a predetermined vacuum pressure is reached the liquid is allowed to be sucked into the chamber by the vacuum. The creation of bubbles is mainly accounted for by the inability of the liquid to prevail to the minute contour of the inner walls of the chamber, since it is difficult to obtain a vacuum sufficient to draw the liquid into every corner of the chamber by the use of a pumping system of reasonable size. Furthermore, during ink ejection process there is a likelihood of bubbles being created or introduced into the liquid during operation and it is thus necessary to let them escape out in to the atmosphere.

On the other hand, in operating the writing unit at high speeds, an amplitude-modulated signal may be used to drive the piezoelectrical crystal. The signal amplitude often falls to a level below the minimum operating voltage of the unit. In such an instance, the liquid in the chamber flows out of the discharge channel and trickles down the front wall of the unit, resulting in the paper being contaminated.

Therefore, an object of the present invention is to provide an improved ink ejection type writing unit in which any bubbles or gases are eliminated to give the unit a fast response characteristic.

SUMMARY OF THE INVENTION

Another object is to provide an improved writing unit which is formed with vent passageways which provide communication between the outer and inner chambers of the unit to the atmosphere in order to allow the liquid in the supply container to flow into the chamber by atmospheric pressure.

A further object is to provide a passageway in the front wall of the unit for discharging the liquid which trickles down the front wall to prevent it from contaminating the unit as well as the paper to which the liquid droplets are directed.

Still another object is to provide a method for filling the writing unit of the invention with liquid from a supply container which is positioned at a level higher than the writing unit to permit the liquid to flow into the chamber of the unit withdrawing the air in the chamber through the vent passageways into the atmosphere, and during or after the chamber is filled the liquid in the chamber is subjected to agitation so that any bubbles therein are caused to float up and escape through the vent passageways out into the atmosphere.

BRIEF DESCRIPTION OF THE DRAWINGS

The invention will be better understood from the following description taken in conjunction with the accompanying drawings, in which.

DESCRIPTION OF THE PREFERRED EMBODIMENTS

Figure 1:
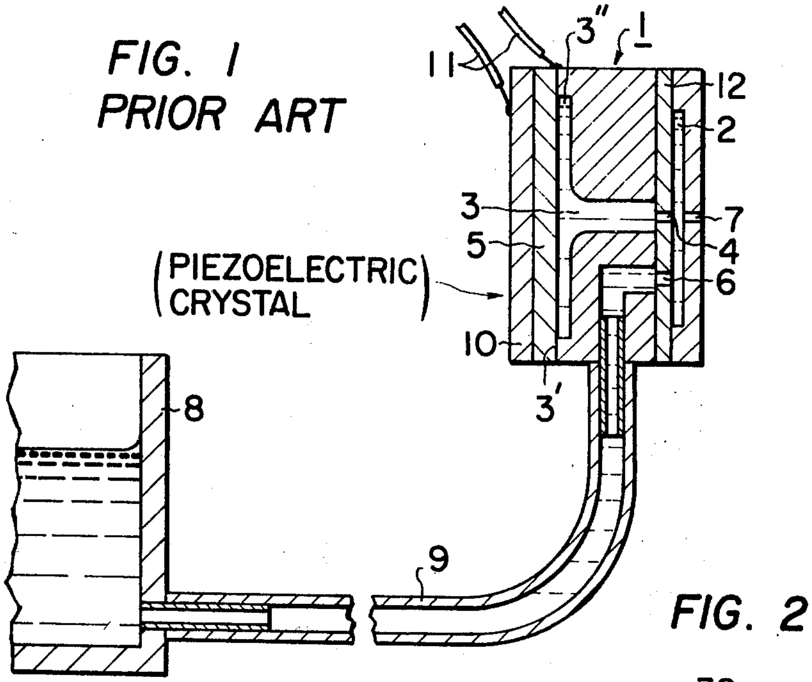
FIG. 1 PRIOR ART
FIG. 1 is a cross-sectional view in side elevation of a prior art writing mechanism with a divided fluid chamber and a fluid container.

Prior to the description of the present invention, reference is made to a prior art writing unit in a simplified form. The writing unit 1 is provided with an outer chamber portion 2 and an inner chamber portion 3 which are in communication through a connecting channel 4, ten to 100 $\mu$m in diameter, which is provided in a dividing plate 12 situated between and forming the separation of the chamber into the chamber portions 2 and 3. The connecting channel 4 is positioned in the dividing plate 12 so that it is directly opposite to and axially aligned with a discharge channel 7 which is provided at the outer end of the outer chamber portion 2 and opens to the atmosphere from the outer chamber portion 2. A circular metal plate or membrane 5 is fastened to the wall 3′ of the inner chamber portion 3. The dividing plate 12 has an intake channel 6 opens into the outer chamber 2 and is in communication with a fluid container 8 via a conduit 9. The container 8 may be disposed at a lower level than the discharge channel 7 because of the capillary forces existing in the channels communicating with the chamber portion 2 after the chamber portions 2 and 3 are filled with liquid. A piezo-electric crystal 10 is attached to the metal membrane 5 in any conventional manner. Conductive wires 11 are provided with one being electrically connected to the metal membrane 5 and the other to the exterior of the piezoelectric crystal 10. The wires 12 supply the control signal to the crystal 10. The inner chamber portion 3 has its one end opposite to the outer chamber portion 2 a larger diameter portion 3″ which is in contact with the metal membrane 5. The cross-sectional area of the discharge channel 7 is substantially smaller than the cross-sectional area of the larger diameter portion 3″.

When the crystal 10 is activated by an electrical pulse, fluid is discharged from the inner chamber portion 3 through the connecting channel 4, through the fluid layer in the outer chamber portion 2 and further through the discharge channel 7 whereupon it is applied to a writing surface. When the pulse drops to zero the direction of the fluid stream in the connecting channel 4 is reversed and fluid is now sucked in through the outer chamber portion 2 from the container 8 via the intake channel 6.

An important factor that influences the response characteristics of the unit is creation of tiny bubbles which might occur within the fluid-filled chamber portions 2 and 3. Since the bubbles will contract in size by the surrounding pressure, the pressure exerted by the membrane 5 by an electrical signal will be partly absorbed by the bubbles and will result in ejection of fluid not proportional to the input signal.

Since the inner chamber portion 3 is closed at one end by the membrane 5 and the outer chamber portion 2 is closed around its periphery and the connecting channel 4 has a very small diameter compared with the chamber portions 2 and 3, the conventional practice is to evacuate the air within the chamber portions 2 and 3, when the prior art writing unit is to be first filled with the fluid in preparation for use. The lowering of air pressure in the chamber portions 2 and 3 is done by pumping the air through the discharge channel 7 while preventing the flow of liquid from the container 8 and when a predetermined vacuum, for example 10 mmHg, is reached in the chamber portions 2 and 3, the liquid is allowed to be drawn to the chamber portions 2 and 3 by the vacuum.

Figure 2:
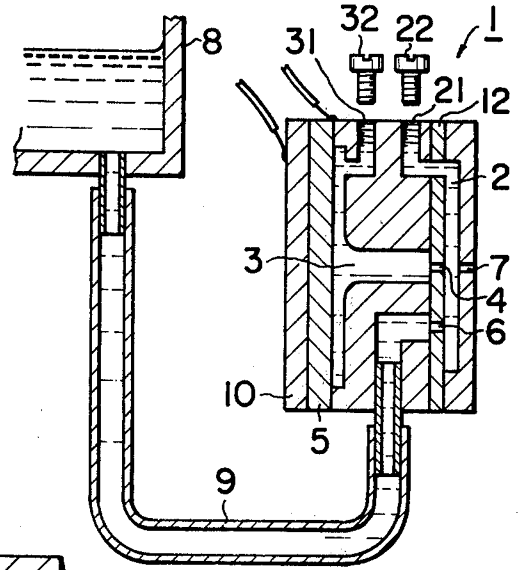
FIG. 2 is a cross-sectional view in side elevation of a writing mechanism of a first embodiment of the invention.

One embodiment of the present invention is shown in FIG. 2 where, for ease of understanding, similar parts are numbered with similar numerals to that shown in FIG. 1. The writing unit 1 of the invention shown in FIG. 2 comprises a structure which is generally similar to that shown in FIG. 1 except that it is formed with a first vent passageway 21 which communicates the outer chamber portion 2 with the atmosphere and a second vent passageway 31 which communicates the inner chamber portion 3 with the atmosphere through the larger diameter portion 3″. Closure means such as bolts 22 and 32 may be threaded into the passageways 21 and 31, respectively, to close their open ends after the writing unit 1 is filled with liquid.

When the fluid container 8 is raised manually to a level higher than the writing unit 1 with the inner and outer chamber portions communicating with the atmosphere, the fluid is caused to flow through the intake channel 6 into the outer chamber portion 2 under the atmospheric pressure and the air in the outer chamber portion 2 will escape through the passageway 21 into the atmosphere. At the same time the inner chamber portion 3 is filled with the incoming fluid through the connecting channel 4, and the air therein is forced out through the passageway 31 into the atmosphere. When both of the chamber portions are filled, the closure means 22 and 32 are fitted into the open ends of the respective passageways. During the filling operation, it is preferred that the writing unit 1 is subjected to vibration which may be caused, for example, by applying 100 volts 50 Hz AC voltage to the piezoelectric crystal 10 via terminals 11. The vibration will cause any bubbles which might occur on the chamber walls due to surface tension to be disclosed therefrom and float up through the passageways 21 and 31 and out into the atmosphere.

Figure 3:
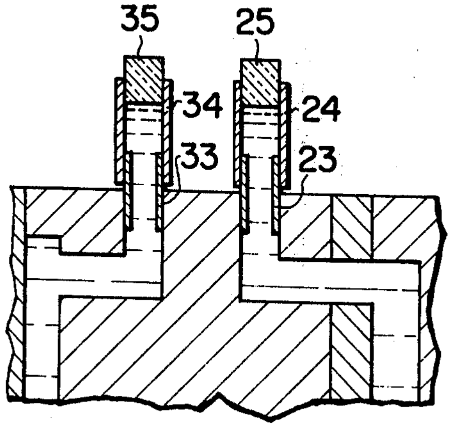
FIG. 3 is a cross-sectional enlarged fragmentary view in side elevation of a modified form of the divided fluid chamber.

A modified form of the embodiment shown in FIG. 2 is illustrated in FIG. 3. The passageways 21 and 31 have their open ends fitted with metal tubes 23 and 33 which in turn are fitted into transparent flexible tubes 24 and 34, respectively. When the fluid reaches transparent tube 24 or 34 during the filling operation, the liquid level is visible from outside. When the tubes 24 and 34 are substantially filled, closure means 25 and 35 are fitted into the open ends of the tubes 24 and 34. During normal ink ejection operation, bubbles may be introduced into the outer or inner chamber portion. The transparent projecting tubes 24 and 34 collect these bubbles. The bubbles will be noticed by the operator through the transparent tubes 24 and 34. By removal of the closure means 25 and 35 the bubbles are allowed to escape.

The writing unit 1 so constructed ensures that the fluid prevails to the minute contour of the structure of the unit without the need for a costly pumping system and lowers the minimum operating voltages, with the resultant fast response time and increased stability. The time it takes to fill the writing unit is also reduced considerably. Furthermore, the provision of the vent passageways 21 and 31 assures easy cleaning of the interior of the inner and outer chamber portions to remove any dust or particles therein.

In some applications, video signal to be reproduced is used to amplitude-modulate a carrier at a frequency of 20 kHz, for example, and the amplitude-modulated signal is used to drive the writing unit, instead of directly applying the video signal as an input thereto the signal level of the modulated signal often becomes below the minimum threshold level of the unit 1. Under this condition, the writing unit becomes incapable of ejecting fluid from the discharge channel 7 in the form of a jet stream, and instead the fluid tends to flow out of the discharge channel 7 and trickle down the front wall 40 of the unit 1 and accumulate at the lower edges of the front wall 40. The accumulated fluid will fall as droplets down to the floor or stains other parts of the unit. Since the front wall 40 is only spaced a distance of 0.05 to 5 mm from the surface of the paper to which the ejected fluid is directed, the paper is likely to be stained by the droplets.

Figure 5:
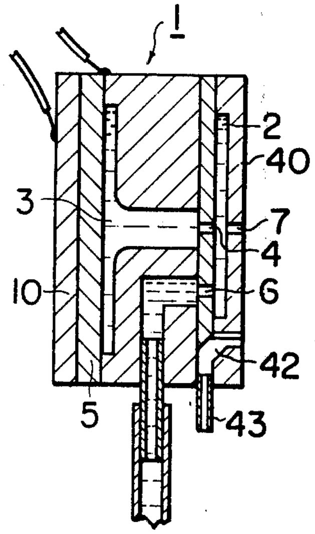
FIG. 5 is a cross-sectional view taken along section line V—V of FIG. 4.
Figure 4:
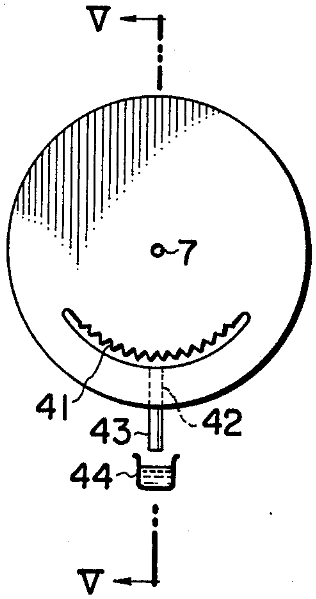
FIG. 4 is a view in front elevation of the writing unit of a second embodiment of the invention.

In order to solve this problem, the writing unit 1 is provided with an arcuate slot 41 on the front wall 40 as shown in FIGS. 4 and 5. The slot 41 is communicated at the intermediate thereof with a bore or duct 42 which leads downward through the dividing plate 12 to the lower surface of the unit 1. The lower open end of the duct 42 is provided with a pipe 43 which assists in discharging the fluid to a receptacle 44. With this arrangement, the droplets which trickle down the front wall 40 will collect in the arcuate slot 41 and will be discharged through the duct 42 to the receptacle 44. The diameter of the duct 42 and of the pipe 43 is such that the fluid is discharged by capillary attraction.

Figure 6:
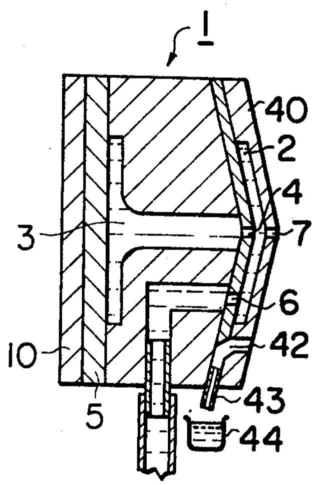
FIG. 6 is a cross-sectional view of a modified form of the writing unit of FIG. 5.

A modified form of the embodiment shown in FIGS. 4 and 5 is illustrated in FIG. 6 in which the front end portion of the writing unit 1 is cone-shaped such that the fluid which trickles from the discharge channel 7 down the wall 40 is kept away from the surface of the paper. The cone-shaped structure will facilitate collection of the trickling fluid to the arcuate slot 41.

The foregoing description shows only preferred embodiments of the present invention. Various modifications are apparent to those skilled in the art without departing from the scope of the present in invention which is only limited by the appended claims. Therefore, the embodiments shown and described are only illustrative, not restrictive.

What is claimed is:

1. In an arrangement for applying liquid droplets to a surface comprising, a liquid-applying unit including a housing with a front wall facing a surface to which the unit is to apply a liquid, a chamber having an intake channel connected to a liquid supply container and a discharge channel in said front wall through which the liquid is discharged from the chamber into the atmosphere, pressure-producing means for producing short duration pressure increases in the liquid in the chamber, the chamber having means dividing the chamber into an outer chamber portion adjacent to the discharge channel and an inner chamber portion, a connecting channel in the dividing means connecting outer and inner chamber portions, the connecting channel being axially aligned with the discharge channel and the intake channel being in communication with the outer chamber portion, the inner chamber portion having a larger diameter portion in contact with the pressure-producing means and a smaller diameter portion adjacent to the connecting channel, the improvement comprising: means defining a first vent passageway for connecting the outer chamber portion to the atmosphere; means defining a second vent passageway connecting the larger diameter portion of said inner chamber portion to the atmosphere; first and second transparent tubes connected at one end to the first and second vent passageways, respectively, and extending outwardly of the liquid applying unit; and first and second closure means removably attached to the other end of the first and second tubes, respectively, so that bubbles in the liquid in the outer and inner chamber portions are collected in the tubes and visible from externally thereof.

2. In an arrangement for applying liquid droplets to a surface, according to claim 1, wherein said front wall is provided with a groove downwardly of said discharge channel to collect the liquid which trickles down the front wall, and means defining a second discharge channel connected to said slot for allowing said collected liquid to be discharged therethrough.

* * * * *